US010511134B2

(12) United States Patent
Tagliaferri et al.

(10) Patent No.: US 10,511,134 B2
(45) Date of Patent: Dec. 17, 2019

(54) LASER SYSTEM FOR GENERATING LASER PULSE OF SUB-NANOSECOND DURATION

(71) Applicant: QUANTA SYSTEM S.P.A., Samarate (VA) (IT)

(72) Inventors: Marco Tagliaferri, Taino (IT); Fabio Paleari, Barlassina (IT); Fabio Cannone, Melzo (IT); Luca Cerri, Varese (IT)

(73) Assignee: QUANTA SYSTEM S.P.A., Samarate (VA) (IT)

( * ) Notice: Subject to any disclaimer, the term of this patent is extended or adjusted under 35 U.S.C. 154(b) by 0 days.

(21) Appl. No.: 15/553,290

(22) PCT Filed: Feb. 24, 2016

(86) PCT No.: PCT/IB2016/050997
§ 371 (c)(1),
(2) Date: Aug. 24, 2017

(87) PCT Pub. No.: WO2016/135638
PCT Pub. Date: Sep. 1, 2016

(65) Prior Publication Data
US 2018/0034231 A1     Feb. 1, 2018

(30) Foreign Application Priority Data
Feb. 25, 2015   (IT) .............................. BG2015A0004

(51) Int. Cl.
*H01S 3/13*     (2006.01)
*H01S 3/115*    (2006.01)
(Continued)

(52) U.S. Cl.
CPC .......... *H01S 3/115* (2013.01); *H01S 3/08081* (2013.01); *H01S 3/10092* (2013.01);
(Continued)

(58) Field of Classification Search
CPC ..... H01S 3/2308–235; H01S 3/11–125; H01S 3/10084; H01S 3/10092; H01S 3/08081; H01S 3/0818
See application file for complete search history.

(56) References Cited

U.S. PATENT DOCUMENTS 4,555,786 A * 11/1985 Byer ..................... H01S 3/0602
                                                      372/34
4,914,663 A *  4/1990 Basu .................... H01S 3/10092
                                                      372/18

(Continued)

OTHER PUBLICATIONS

Ganeev et al., Highly Efficient Neodymium Glass and Yag Picosecond Pulse Amplifiers, Quantum Electronics, London, GB, Dec. 1, 1992, vol. 26, No. 12.

(Continued)

*Primary Examiner* — Tod T Van Roy
(74) *Attorney, Agent, or Firm* — King & Schickli, PLLC

(57) ABSTRACT

A laser system for generating a series of laser pulses comprising a laser generator that supplies an injection pulse to an amplifier; said amplifier comprising: a gain medium enclosed between a first mirror and a second, output, mirror opposite to said first mirror; and an optical switch set in the proximity of said first mirror; said laser system being characterized in that said amplifier is an unstable laser resonator and said injection pulse is supplied to said laser resonator in synchronism with opening of said optical switch; said series of laser pulses comprises at least one pulse having a duration shorter than or equal to 2 ns and an energy higher than 100 mJ and at least three times higher than the energy of any other pulse of said series of pulses.

11 Claims, 6 Drawing Sheets

(51) Int. Cl.
  *H01S 3/08*    (2006.01)
  *H01S 3/10*    (2006.01)
  *H01S 3/23*    (2006.01)
  H01S 3/092    (2006.01)
  H01S 3/16     (2006.01)

(52) U.S. Cl.
  CPC ........ *H01S 3/1305* (2013.01); *H01S 3/13013* (2019.08); *H01S 3/2308* (2013.01); H01S 3/092 (2013.01); H01S 3/1611 (2013.01); H01S 3/1643 (2013.01)

(56) References Cited

U.S. PATENT DOCUMENTS

| | | | |
|---|---|---|---|
| 7,535,631 B2* | 5/2009 | Brown | G02B 27/1006 359/341.1 |
| 2005/0157381 A1* | 7/2005 | Kafka | H01S 3/235 359/346 |
| 2006/0268950 A1 | 11/2006 | Kane | |
| 2008/0015662 A1 | 1/2008 | Tunnermann et al. | |
| 2008/0225914 A1* | 9/2008 | Gurusami | H01S 3/06754 372/38.02 |
| 2011/0069733 A1* | 3/2011 | Ye | H01S 3/0804 372/95 |

OTHER PUBLICATIONS

T. Yamane, Intracavity Amplification of Mode-Locked Pulses by CW Nd: YAG Laser Gain Switching, IEE J. Quantum Electronics, Sep. 9, 1977, vol. QE-13.

\* cited by examiner

LASER SYSTEM FOR GENERATING LASER PULSE OF SUB-NANOSECOND DURATION

This application is the national stage of PCT/IB2016/050997, filed Feb. 24, 2016, which claims priority from Italian Application No. BG2015A000004, filed Feb. 25, 2015.

SUMMARY OF THE INVENTION

Description

The present invention relates to a laser system for generating laser pulses of duration shorter than one nanosecond. In particular, for generating laser pulses having a high energy, i.e., higher than 100 mJ, and peak powers of the order of gigawatts, and more precisely in the range of from hundreds of megawatts up to a few gigawatts.

Laser energy is applied in an ever-increasing number of sectors, such as telecommunications, industrial applications, scientific research, and many others. In particular, in the medical sector, lasers have proven useful in surgical and cosmetic procedures.

Interaction between the laser and the biological tissue may be of a photothermal type, when, that is, light energy is transformed into heat, of a photochemical type, which exploits, for example, the use of photosensitizing substances (e.g., for photodynamic therapy), or of a photoacoustic type, when, that is, light waves are transformed into acoustic waves, which mechanically break down the target tissue, destroying it (e.g., for lithotripsy or destruction of pigments of tattoos). Absorption of laser radiation by a particle present in a biological tissue, such as for example a pigment, produces a rapid heating with temperatures that may even reach 900° C. (Basics in Dermatological Laser Applications, Inja Bogdan Allemann, D. J. Goldberg—2011). Heating induced by the energy of laser radiation takes the name of "photothermal effect". As the particle heats up, it undergoes thermal expansion. Laser sources that induce this phenomenon are sources operating in a pulsed regime, in particular with pulses of the order of tens of nanoseconds that exploit the Q-switching phenomenon, which produce a very rapid heating of the particle. Rapid heating results in a violent expansion that generates an acoustic shock wave. Generation of the acoustic shock wave takes the name of "photoacoustic effect". If the fluence of the laser energy that impinges upon the target particle is sufficient, the shock wave generated has a destructive force that exceeds the threshold of fracture of the particle, thus bringing about its fragmentation. Then, the fragments produced undergo phagocytosis by the macrophages and are removed through the lymphatic vessels. The efficiency of the photoacoustic effect depends upon the confinement coefficient, which establishes that the photoacoustic effect is all the more efficient, the shorter the duration of the laser pulse with respect to the time of propagation of the acoustic wave within the target particle. The time of propagation of the acoustic wave within the target particle depends upon the diameter 2r of the particle itself and upon the speed of propagation of the wave therein. Thus, the duration of the laser pulse ($\tau$) is a fundamental parameter for fragmentation of particles of different diameter. For instance, particles of a diameter of a few microns may be destroyed using laser energy having pulses of a duration in the region of a few hundreds of picoseconds. In addition to these pulses of short duration, for fragmentation of particles high-energy laser pulses are necessary. In fact, apart from the fact that to generate the photoacoustic effect a sufficient fluence is required, it must be considered that the particles to be fragmented are located underneath the surface of the skin. Simulations show that for a 1064-nm laser radiation, only 25%-10% of the laser radiation can penetrate to a depth of 2 mm-3 mm, respectively, below the surface of the skin. Then, the fluences of treatment required are around several joules per square centimetre (2-4 J/cm$^2$), and this results in an emission of laser energy of several hundreds of millijoules per pulse or more.

Consequently, in aesthetic-medical applications, such as removal of tattoos, pigmented benign lesions, vascular lesions, treatment of cicatricial tissue, there is the need for laser systems that, in addition to the aforesaid characteristics of fluence and duration of the pulse, present extreme stability over time, rapid integration, low costs, and ease of maintenance. In the literature, laser solutions are proposed (U.S. Pat. No. 7,586,957, WO2013158299, and WO2014027316) that are capable of creating sub-nanosecond pulses with an energy in the region of a few hundreds of millijoules, but the optical structure of which is complex, unstable, and not easily integratable.

A solution capable of generating a train of sub-nanosecond pulses with high peak power is described in US73,914,794 B2, where a pulse-injected Q-switched laser used for frequency duplication is described. In this case, an amplifier is injected with a laser pulse of a duration of a few hundreds of picoseconds. In this way, instead of the Q-switching pulse, a pulse train is produced having a total duration equal to that of the Q-switched pulse and an enhanced peak power. This result is undoubtedly advantageous for frequency conversion, as clarified in US73,917,954, but it is evident to the person skilled in the sector that this solution does not generate a single pulse but produces a pulse structure the contrast (i.e., the ratio between the intensity of the most energetic pulse and the other pulses) of which is not defined. The condition of having just one highly energetic pulse that has sub-nanosecond duration and is stable over time is a condition necessary for fragmentation of particles present in deep regions of a biological tissue by photoacoustic interaction.

The aim of the present invention is to generate a pulse train characterized in that more than 60% of the total energy of the aforesaid pulse train is contained in a main pulse having a duration shorter than one nanosecond.

Another aim is to obtain a pulse train of the aforesaid type with a marked contrast in terms of energy between the aforesaid main pulse and the other pulses of the train.

Yet another aim is to provide a laser system capable of generating a pulse train as described above that will be repeatable and stable over time.

A further aim of the present invention is to provide a laser system that is compact and can be easily integrated.

Further aims are to provide a laser system for generating laser pulses with high energy, i.e., higher than 100 mJ, up to 1.5 J, and peak powers of the order of gigawatts, and more precisely in the range from hundreds of megawatts up to a few gigawatts.

According to the present invention, the above aims and others still are achieved by what is specified in the annexed claims.

The laser system described herein is based upon amplification of pulses by means of a resonator operating in Q-switching regime that amplifies the pulses produced by an injection laser, which is able to produce pulses of sub-nanosecond duration (100 ps-2 ns) with an energy equal to or higher than 10 ps. Advantageous is the use of an unstable resonator, which, thanks to a high gain reached by means of appropriate optical solutions, has proven particularly advantageous because it has been found that it produces a high-energy pulse train that is controllable and has a sufficiently high peak. The desired operating conditions are obtained through appropriate control electronics.

The solution that is proposed in the present patent consists of a laser system capable of generating highly energetic sub-nanosecond pulses using an extremely compact and stable architecture, thus rendering it ideal for the sphere of application of interest. Advantageously, the pulse train generated can be controlled by acting on the gain of the resonator in order to create different significant operating conditions, which can be rendered stationary and repeatable in the long term by means of a dedicated automatic control system. This solution is able to produce pulses with a duration in the range comprised between 100 ps and 2 ns. In the light of the properties of the photoacoustic effect described above, this broad time range enables fragmentation, in a single process, of particles of different diameter (0.6 μm-12 μm). Moreover, the possibility of generating a pulse train at an appropriate frequency renders the photoacoustic process far more efficient. It will be seen, in fact, that, by exploiting the double-pulse condition, it is possible to induce an enhancement of the photoacoustic process, thus increasing the effectiveness of the laser system in the specific applications. This possibility renders the solution proposed less invasive on biological tissue and at the same time more effective for fragmentation of target particles.

In the field of aesthetic-medical applications based upon photoacoustic interaction, the present invention represents a considerable advantage over the prior art, enabling the limits deriving from use of a source with sub-nanosecond pulses capable of producing pulses of fixed duration to be overcome. An improvement in terms of compactness and reliability of the system is obtained.

BRIEF DESCRIPTION OF THE DRAWING FIGURES

The characteristics and advantages of the present invention will emerge clearly from the ensuing detailed description of a practical embodiment thereof, which is illustrated by way of non-limiting example in the annexed drawings, wherein.

DETAILED DESCRIPTION OF THE INVENTION

Figure 1:
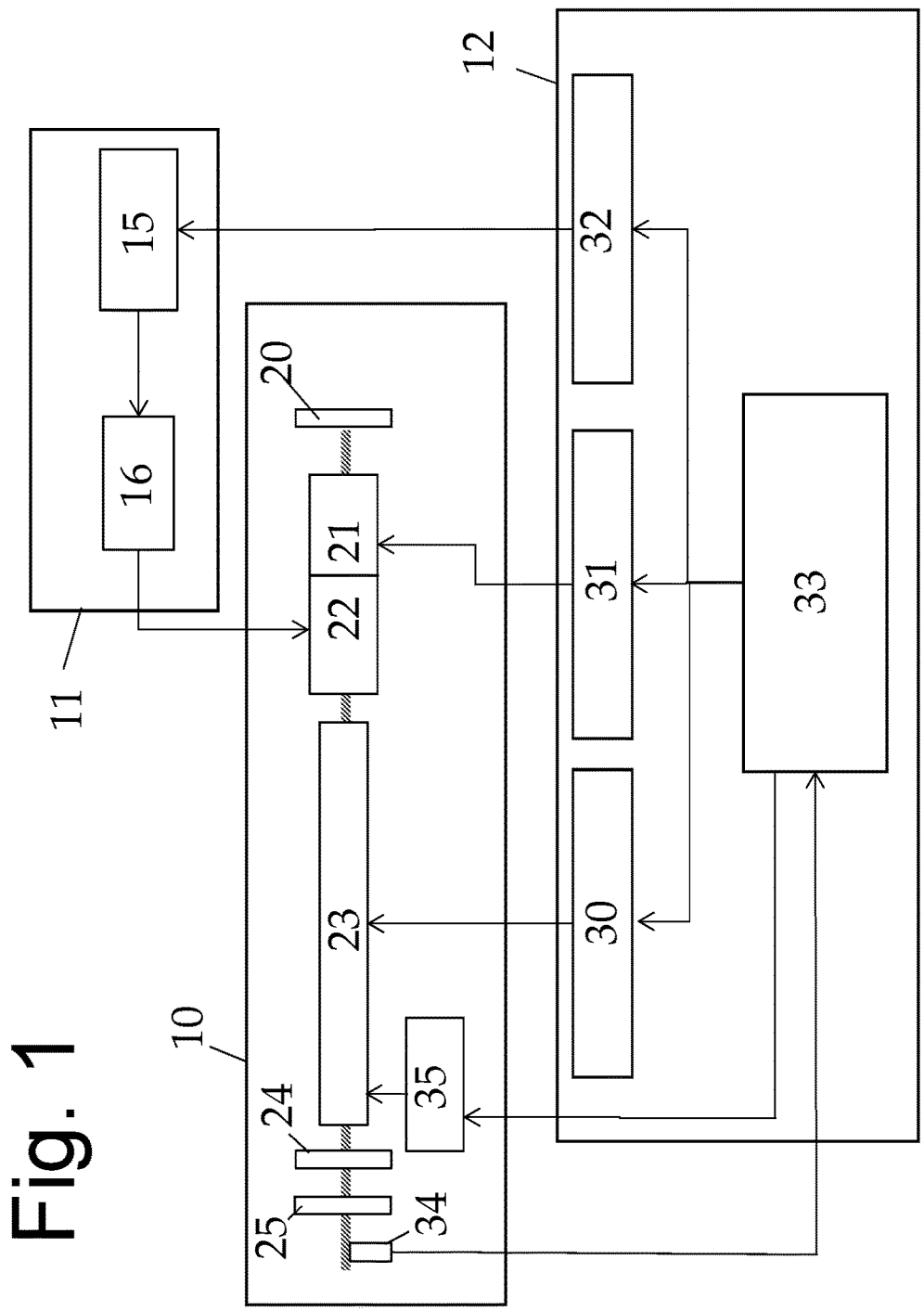
FIG. 1 shows a block diagram of a laser system, according to the present invention.
Figure 2:
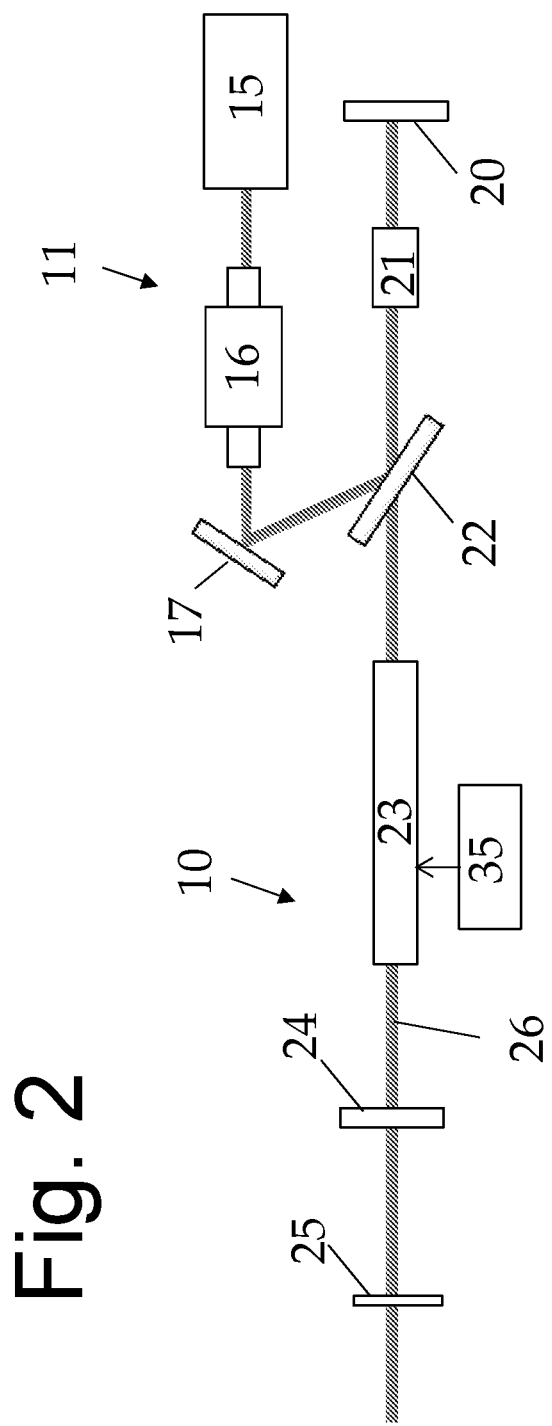
FIG. 2 shows a block diagram of a laser generator coupled to a laser resonator, according to the present invention.
Figure 3:
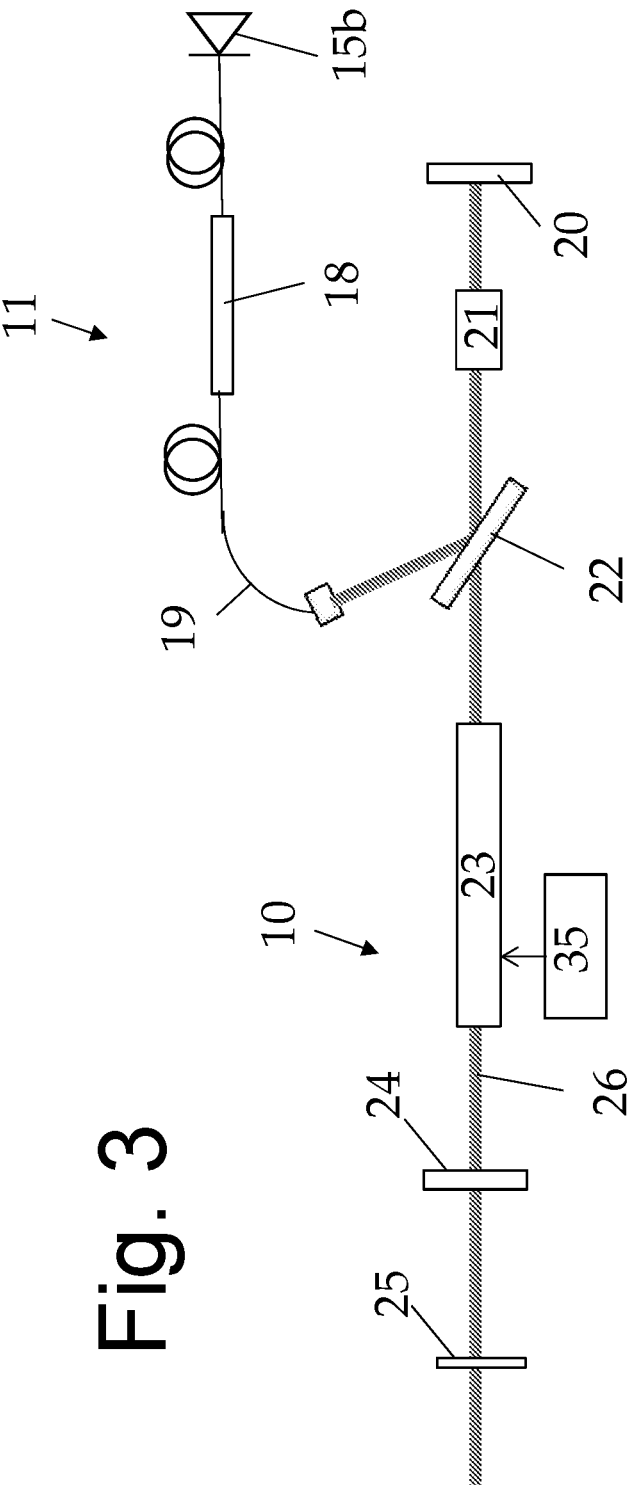
FIG. 3 shows a block diagram of a laser generator coupled to a laser resonator, according to a variant of the present invention.

With reference to the attached figures, a laser system, according to the present invention, comprises an amplifier 10, an optical injection source 11, and a control electronics 12.

The amplifier 10 is obtained by means of an unstable resonator operating in Q-switching regime, which comprises in succession a first mirror 20 with high reflectivity (>99%), an electro-optical switch 21, preferably comprising a quarter-wave plate, and a Pockels cell (potassium dideuterium phosphate), a polarizer 22, a gain medium 23, and a second, output, mirror 24 having, by way of example, a coupling coefficient of 4%, set opposite to the first mirror 20. Preferably, it moreover comprises a half-wave plate 25 that functions as power regulator.

All the elements listed above are arranged along an axis 26 of the amplifier 10.

The gain medium 23 is an Nd:YAG bar (neodymium-doped yttrium aluminium garnet with 1.1% doping), housed in a diffusive pumping chamber. The pumping source is constituted by a flash lamp 35.

As an alternative to the Nd:YAG bar it is possible to use other gain medium, such as, by way of non-limiting example, Nd:YAP, Nd:YAlO$_3$, Nd:YLF, Nd:KGW, ruby or else Er, Yb, Tm, and Ho, in different matrices. This enables generation of different laser wavelengths.

The injection source 11 has the function of generating an injection pulse for the amplifier 10 having a predetermined wavelength and a duration arbitrarily shorter than the to-and-fro time of flight of the pulse of the amplifier, referred to as "round-trip time", equal to 3.3 ns in the present description of embodiment. Values comprised between 2 ns and 5 ns are equally valid to obtain a similar performance. It is known that by varying optical parameters of the amplifier, such as the optical length, it is possible to increase or reduce the aforesaid value.

By way of example, the source 11 comprises in succession a laser source 15, an isolator 16, and a mirror 17.

It is possible to use as injection source 11 a semiconductor laser obtained so as to guarantee the spectral characteristics useful for amplification. It must have peak power values of the order of tenths of a watt, which, for a duration of 100 ps, produce energy pulses of the order of tens of picojoules. In this case, the injection laser 11 comprises a semiconductor-diode laser 15b and an isolator 18, and is coupled to the amplifier 10 by means of an optical fibre 19 that directs the laser beam onto the polarizer 22. The coupling fibre is preferably a single-mode (SM) polarization-maintaining (PM) fibre.

In a possible embodiment, the pulse is generated by a commercial source 11, model "Wedge XF" manufactured by Bright Solutions S.r.l., which has an energy of approximately 40 μJ, a wavelength of 1064 nm, and a duration of 450 ps. The pulses produced have a linear polarization, with an extinction ratio higher than 200:1. The spectrum of emission of the injection source has a band centred at 1064.1 nm and an FWHM (full width at half maximum) of 0.166 nm. In the absence of the injection pulse, the pulses generated by the resonator 10 (with the electro-optical switch 21 supplied) have a duration of approximately 6 ns and an energy of up to 1.5 J at 1064 nm. The resonator thus configured, whether injected or not, is optimised for operation at the repetition frequency of 10 Hz.

The spectrum of emission of the injection source must be compatible with the gain spectrum of the amplifier; i.e., it must have a wavelength of 1064.1 nm, and an FWHM of less than 120 GHz. These conditions indicate that the injector 11 is not a narrow-band injector like the one commonly used in other layouts (U.S. Pat. No. 5,838,701).

To guarantee injected operation, the value of the coupled energy (spatial superposition with the cavity mode, spectral superposition with the bandwidth of the amplifier) must produce an intensity higher than the value present in the cavity at the moment of injection. In particular, if the pulse is injected at the moment when the electro-optical switch 21 is opened, given that at this instant the radiation in the cavity is constituted just by spontaneous emission of the active medium 23, there is obtained injected operation of the resonator with minimum injection energy. In particular, to obtain what has been described above, the pulse coming from the source 11 must present along the axis 26 (element 22) when the electro-optical switch 21 has just opened.

The laser system described above envisages a control electronics 12 that enables synchronisation of spatial and temporal injection of the pulse into the amplifier 10 and control of the gain of the resonator by varying the intensity of the pumping source 35. The control electronics 12 comprises the drivers 30 for excitation of the active material 23, the drivers 31 for control of the electro-optical switch 21, and the drivers 32 for control of the optical injection source 11. The synchronisation system 33 enables regulation of the delays between emission of the injection pulse and opening of the electro-optical switch 21, and excitation of the active material 23. In particular, the lamp 35 of the pumping source is turned on according to the normal timing of a resonator of this sort.

The control electronics 12 moreover comprises an input that receives the signal coming from a photodiode 34 set along the axis 26 of the amplifier 10.

In the time domain, the injection pulse generated by the optical injection source 11 must be injected upon opening of the electro-optical switch 21 so as to maximise the energy of the pulse coupled to the oscillator.

In the spatial domain, injection of the pulse must be aligned with the axis of the resonator 10. Synchronisation is guaranteed by the control electronics 12, whilst the opto-mechanical system 17 and 22 enables optimisation of alignment of the injection beam with the optical axis 26 of the resonator.

Figure 4:
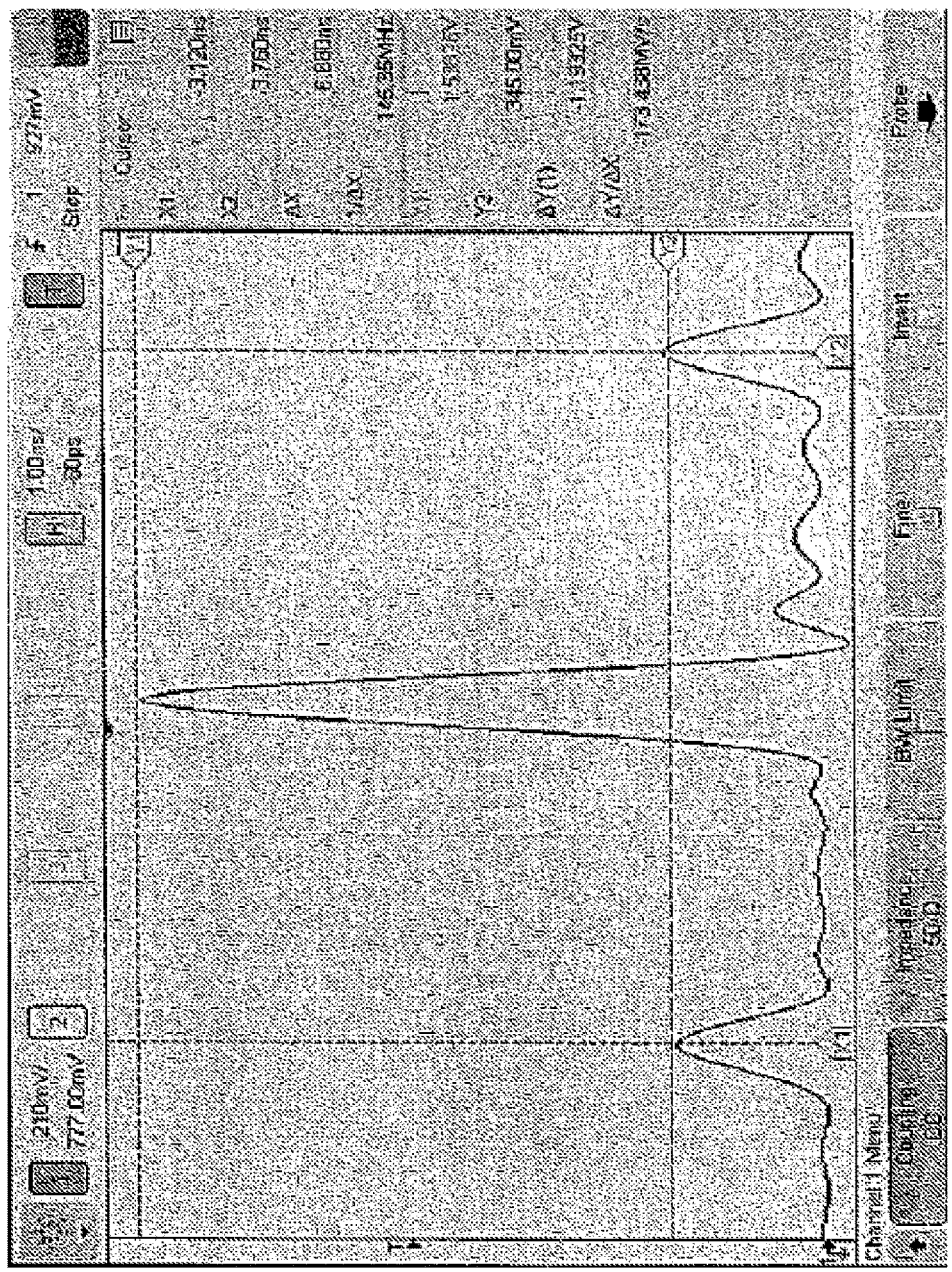
FIG. 4 shows an image, acquired via a high-resolution oscilloscope (Agilent MSOX4104A), of the pulse train generated.
Figure 5:
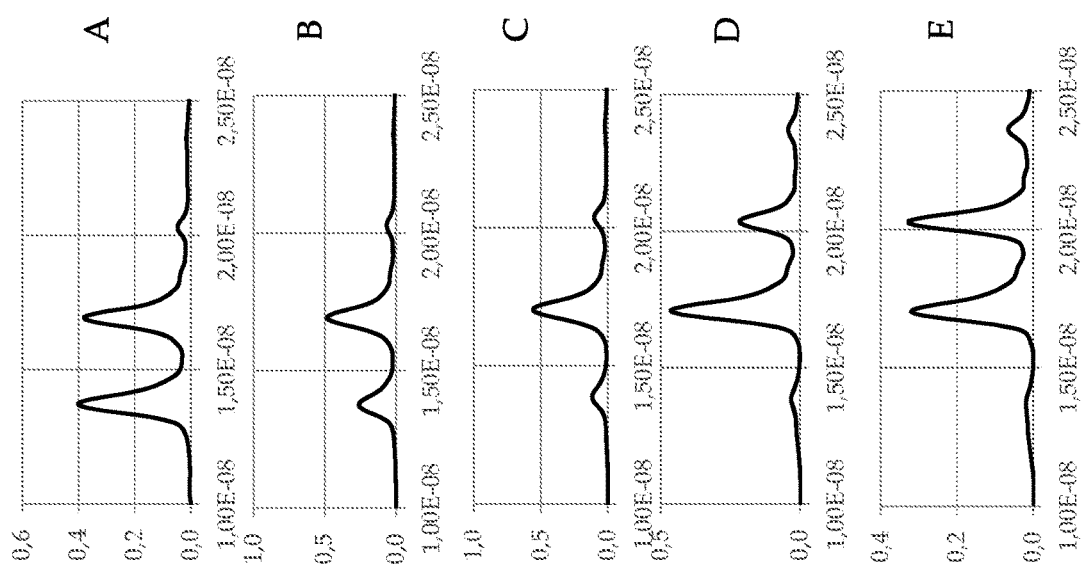
FIG. 5 shows some graphs of the real envelopes of the pulses obtained as the gain of the laser resonator varies, according to a variant embodiment of the present invention.

Via the guaranteed synchronisation of the electronics 12, using the source 11 described above for injection of the unstable resonator 10, a pulse train is obtained, characterized by a maximum total energy of approximately 1.5 J and a duration of the pulse train equal to that obtained by getting the resonator to function in Q-switching mode. The pulses are separated 3.3 ns from one another, and each pulse has the same duration as the injection pulse. Using an unstable resonator 10, in which there is a gain medium 23, such as the one described above, that is pumped via a flash lamp 35, optimised for operation at the repetition frequency of 10 Hz, a resonator with high gain (>27 dB) is obtained. By acting on this high gain of the resonator it is possible to control the pulse train generated (FIG. 4) in order to create different significant operating conditions (FIG. 5).

These configurations can be rendered stationary and repeatable in the long term by means of a dedicated automatic control system 42. FIG. 4 illustrates a real example of the pulse train obtained. The configuration described above enables the pulse train to be made up of three pulses ($V_p$, $V_{-1}$, $V_{+1}$ in FIG. 4), at the most four, which contain more than 99% of the total energy of the train. Within this pulse structure there is a main pulse ($V_p$) that contains more than 60% of the total energy of the pulse train. In conclusion, thanks to the high gain produced, the pulse train generated is made up of a main pulse containing the majority of the energy of the train itself, so that this system may be considered as a laser device that generates a single highly energetic laser pulse with a duration shorter than one nanosecond. It is possible to obtain a configuration in which the main pulse is the central one in the pulse train, and the other two pulses are set at its sides. In addition, in this configuration it is obtained that the energy of each of the side pulses is approximately the same (FIG. 4). This configuration is a structure with high contrast between the energy contribution of the central pulse and the energy contribution of the two side pulses. In this document, with reference to FIG. 4, by "contrast" is meant $$V_p / \left( \frac{V_{+1} + V_{-1}}{2} \right)$$

In particular, in FIG. 4, the contrast obtained is equal to 1.53/[(0.345+0.345)/2]>4.4, and the energy of the central peak is approximately 0.9 J.

By way of example, we present three high-contrast configurations:
- the energies of the individual pulses are 1.12 J for the central pulse and ~370 mJ for the two side pulses (contrast 6:1);
- the energies of the individual pulses are 1.0 J for the central pulse and ~400 mJ for the two side pulses (contrast 5:1);
- the energies of the individual pulses are 0.66 J for the central pulse and ~440 mJ for the two side pulses (contrast 3:1).

These configurations are important for the application of interest given that each pulse train, with a contrast like the one described above, operates as if a single pulse were acting, the energy and pulse duration of which are those proper to the central pulse. In an alternative configuration, it is possible to cut, eliminate, or reduce at least by a factor of 10 the side pulses through a further electro-optical modulator, set downstream of the element 24, which has a time window such as to transmit just the main pulse and attenuate the other pulses of the train. This window is appropriately synchronised via the electronics 33.

Moreover, this main pulse has a duration that is shorter than one nanosecond. In conclusion, the solution proposed herein enables creation of a single sub-nanosecond pulse that is highly energetic.

By envisaging use of the laser system described above in a product for application in the medical field, over long times that involve ageing of the materials (lamp), perturbations due to mechanical stresses, and a wide range of environmental conditions, it has been necessary to develop a diagnostics and feedback system 42 such as to guarantee, for the entire duration of the application and at each turning-on of the laser system, occurrence of a pulse train as shown in FIG. 4. The above diagnostics and feedback system is based upon the fact that the amplitude of the pulses in the train described above depends upon the temporal dynamics of the gain and of the losses of the resonator 10.

Figure 6:
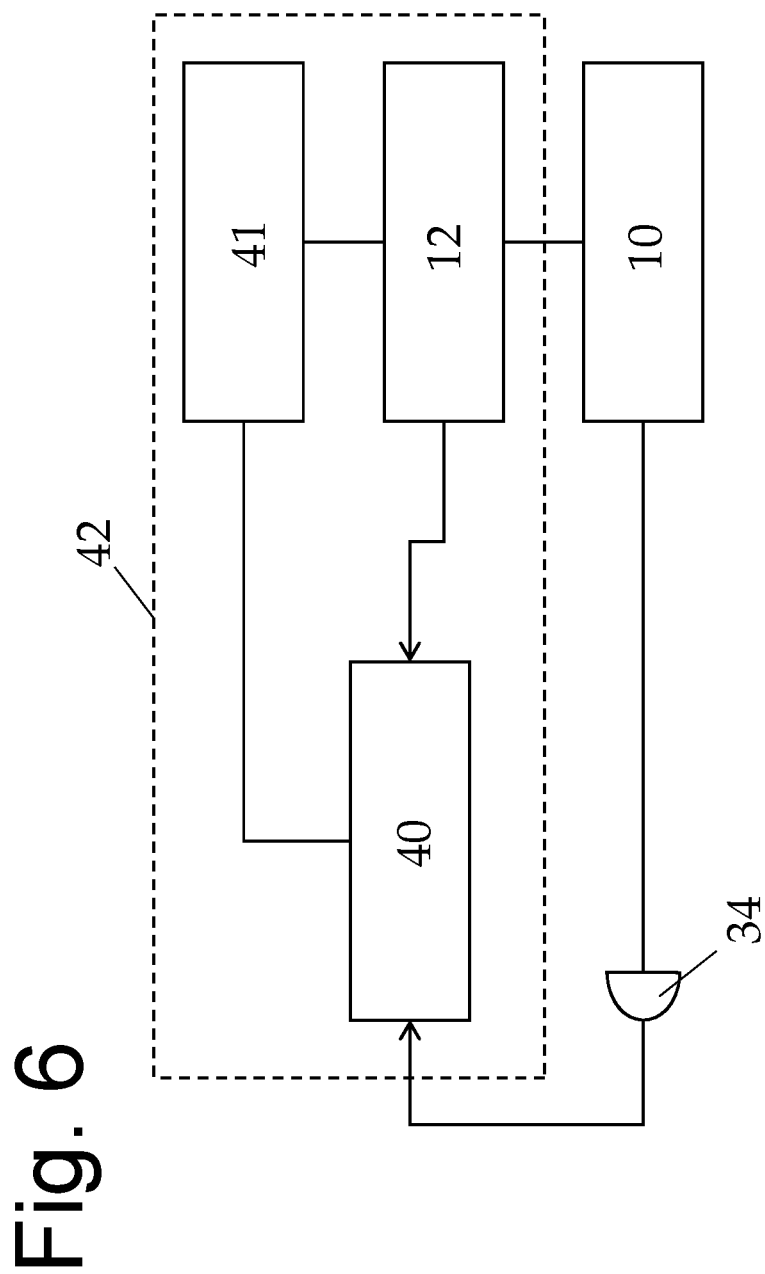
FIG. 6 shows a block diagram of a control circuit of a laser amplifier, according to the present invention.

The above diagnostics and feedback control system is schematically illustrated in FIG. 6. It is constituted by: a photodiode 34 with a sufficiently wide bandwidth as to resolve the individual pulses (by way of example, a photodiode Centronics AEPX65 with 500-MHz bandwidth has been used), which measures the radiation emitted by the laser; a fast sampler 40 that acquires the photocurrent generated (in the experimental case, a commercial sampler with a 500-MHz analog bandwidth and a 5-GS/s sampling frequency has been used); a synchronisation system for synchronising acquisition with laser emission; and a first processor 41 that processes the data received and sends commands to the control electronics 12 that controls the parameters of the laser system 10. In particular, the parameters of the laser that are controlled so as to guarantee the condition of FIG. 4 are the temporal dynamics of the gain and of the losses of the resonator 10.

The analysis algorithm that is executed by the processor 41 analyses the digitized data in the following steps:
- treatment of noise, for example by subtracting the electronic background noise;
- identification of the peaks where the time and amplitude of the pulses acquired are measured; and
- comparison with the desired configuration, and communication, with the control electronics, of the variations of the parameters necessary for approaching the desired configuration (increase or reduction of the gain).

Given that the variations are slow (of the order of minutes or even slower), a real-time feedback is not necessary.

In conclusion, the introduction of the diagnostics and feedback system 42 in the system made up of the amplifier 10, the injector 11, and the control electronics 12 enables the single highly energetic sub-nanosecond pulse to be extremely stable over time and enables it to be obtained at each turning-on of the system.

FIG. 5 shows the real trains of the pulses obtained as the gain varies, obtained with appropriate instrumentation, where appearing on the ordinates are the amplitudes and on the abscissae the times.

As the gain increases, i.e., from graph E to graph A in FIG. 5, the injection pulse reaches saturation in a smaller number of cycles and the maximum peak of the pulse train occurs at earlier instants in time; instead, as the gain decreases, the injection pulse reaches saturation in a larger number of cycles, and the maximum peak of the pulse train occurs at later instants.

In the experimental case, the supply voltage of the lamp 35 has been used to control the gain of the resonator and hence the shape of the pulse train. An equivalent result is obtained by controlling the losses of the resonator with fixed supply voltage of the lamp 35, for example by regulating the voltage on the Pockels cell 21.

In FIG. 5, the graphs are ordered for decreasing gain values. In the proposed solution it is possible, starting from the condition illustrated in graph A, to pass with continuity from one pulse-train configuration illustrated to the next and to obtain a variation of the total energy in the train of less than 20%. In particular graph A is obtained with an energy≈5% higher than that of graph C, whereas graph E is obtained with an energy≈12% smaller than that of graph C. Once the gain of the resonator is fixed, the configuration of the pulse train is stable.

The peak power of the main pulse is 2.7 GW, for a duration of 450 ps. The energies obtained represent the limit within which operation of the resonator used in the present experimental embodiment may be deemed reliable. It will be clear to the person skilled in the sector that a perturbation of the system can alter the contrast of the pulses from the configuration of graph C to the configuration of graph B, or else from the configuration of graph C to the configuration of graph D. The diagnostics and feedback system 42 intervenes immediately to bring the system into the desired configuration of graph C.

Of particular interest is the case illustrated in graph E of FIG. 5. In this case, which is referred to as "double-pulse condition", a pulse train is obtained characterized by the presence of two main pulses of equal intensity. In this condition, each of the pulses has an energy higher than 600 mJ corresponding to a peak power, for a pulse duration of 450 ps, of 1.3 GW.

By reducing the pump current in the injection source, it is possible to obtain pulses of a duration longer than what has so far been described, albeit of lower energy. In the experimental case, the source can function stably ($\Delta E_{seed}/E_{seed}<5\%$), thus regulating the duration of the pulse to a value of approximately 1 ns. In this condition, the energy emitted is approximately 15 µJ, which is still sufficient to enable injected operation. At output from the amplifier, pulses are obtained with an energy identical to that of the cases described above and with a pulse duration of 1 ns (peak power of approximately 1.2 GW, in the case of a single main pulse, and 0.6 GW, in the case of double main pulse). The system forming the subject of the invention envisages the possibility of regulating continuously (from 450 ps to 1 ns) the duration of the pulse of the injector and consequently the duration of the pulses at output from the amplifier provided that an appropriate synchronisation is carried out.

The use of semiconductor lasers capable of producing optical pulses of sub-nanosecond duration, characterized by peak-power values of the order of tenths of a watt, which, for a duration of 100 ps, produce energy pulses of the order of tens of picojoules, in particular with an energy equal to or higher than 10 pJ and lower than 30 pJ. Using this injection source, it is possible to regulate continuously, or as an alternative in steps of 100 ps, the value of the duration of the pulses produced by acting on the control system. Moreover, the possibility of using as injection laser a diode coupled in optical fibre 17, enables generation of pulses of arbitrary shape and duration, with a duration in the range [100 ps; 2 ns]. The advantages afforded by the solution based upon a diode injection source coupled in optical fibre are multiple, in fact, it enables arbitrary management of the parameters of duration and shape of the pulses produced and enables interconnection by means of single-mode optical fibre, guaranteeing all the advantages of flexibility of transport and optical and mechanical interconnection (consider an FC/APC connector), thus guaranteeing a high quality standard (reliability, reproducibility) and a marked reduction in costs, also obtained thanks to the availability of a high-performance and low-cost optical isolator 18 obtained with optical fibre.

Thanks to the possibility of generating high-contrast pulse trains as described above, it is possible to identify different operating modes of the laser system forming the subject of the present invention that produce an increase in efficiency of the photoacoustic process as compared to the prior art in applications such as, for example, removal of tattoos, removal of pigmented benign lesions, removal of vascular lesions, and treatment of cicatricial tissue. In particular, it is possible to define a "single-pulse" operating mode (in the case represented in graph C of FIG. 5), and it is possible to define a "double-pulse" or "additive" operating mode (in the case represented in graph E of FIG. 5).

Single-pulse mode. The laser solution proposed is able to generate pulses having a duration ranging from 100 ps to 2 ns. By way of example, we may consider a graphite particle of a diameter of 600 nm set at 2 mm from the surface of the skin. It is treated with a laser beam having a fluence of 2 J/cm$^2$ with a pulse duration of 100 ps. Given that the energy absorbed by the particle is approximately $1.7\times10^{-9}$ J, the latter undergoes a sudden increase in temperature, with consequent generation of an acoustic wave that determines a pressure higher than 1000 bar. This value is more than sufficient to fragment the particle. If the same experiment were to be carried out with a pulse having a duration of approximately 6 ns, the confinement factor would be too low, more than 10 times lower than the previous one, so that the pressure exerted would not even reach 100 bar, and hence fragmentation of the particle would not occur. This limit is today overcome by increasing the energy of the laser source, with a consequent increase in the laser fluence that strikes the surface of the biological tissue. The result of this is an undesired damage by the thermal effect to the first layers of skin. In conclusion, the solution proposed enables fragmentation of small target particles without undesired effects in the biological tissue. Moreover, by exploiting the wide range of durations that this solution can generate in a stable way, it is possible to increase the range of the diameter of the particles that can be shattered, at the same time guaranteeing the maximum efficiency for the photoacoustic effect. In conclusion, unlike in the case of the prior art (U.S. Pat. No. 7,586,957), it is possible to fragment, by the photoacoustic effect, particles that have a diameter comprised in the range (0.6 µm; 1.2 µm).

Additive mode. The system forming the subject of the present invention, used in the "double-pulse" condition, enables production of two identical and successive interactions on one and the same target particle. Given that the temporal separation between the two pulses is 3.3 ns, it is possible to exclude the effect of frosting on the skin, the temporal dynamics of which has values higher than a few nanoseconds (Facial Plastic and Reconstructive Surgery, Ira D. Papel Thieme, 2009). Hence, both of the pulses interact with the target in an identical way, generating two shock waves in sequence, the effect of which is the sum of the individual effects because, in the time interval in which they follow one another, there cannot arise perturbing effects. In conclusion, the laser solution proposed, if compared with any other existing solution, enables reduction of the process time. This operating mode is not limited to the case of two pulses but extends to a sequence of n pulses capable of producing n effective interactions in succession.

Synchronous mode. By exploiting the double-pulse condition, it is possible to fragment particles of diameters greater than one micron thanks to the synchronous effect of two laser pulses generated at the frequency of 300 MHz ($\Delta t=3.3$ ns). Numerical simulations show that to fragment particles of increasing diameter the intensity of the fragmentation force induced by the photoacoustic effect, and hence the fluence of the laser radiation on the particle itself, must be increased. The solution proposed enables generation of two shock waves, the fragmentation effect of which occurs within one and the same particle consequently, within the target particle there occurs an amplification of the photoacoustic effect, with the consequence that the fragmentation force increases in intensity, without having to increase the fluence of laser radiation on the particle itself. Hence, the synchronous mode enables removal of particles in a less invasive way as compared to the prior art thanks to an increase in the efficiency of the photoacoustic effect produced by the aforesaid synchronous effect. In fact, it is known that lasers with pulses that are extremely short in duration (<100 ps) may be less efficient and more invasive on the biological tissue (whitening of the skin) than laser pulses of longer duration. In conclusion, the possibility of using the solution set forth herein in synchronous mode with duration of the pulses of approximately 1 ns is hence undoubtedly less invasive and presents an effectiveness of the photoacoustic effect comparable to that produced by laser pulses that have a short duration.

The invention claimed is:

1. A laser system for generating a series of output laser pulses comprising a laser generator that supplies an injection pulse to an amplifier; said amplifier comprising: a gain medium enclosed between a first mirror and a second, output, mirror opposite to said first mirror; and an optical switch set in the proximity of said first mirror; said system being characterized in that: said amplifier is an unstable laser resonator, and said injection pulse is supplied to said laser resonator in synchronism with opening of said optical switch; and said series of output laser pulses comprises at least one pulse having a duration shorter than or equal to 2 ns and an energy higher than 100 mJ and at least three times higher than the energy of all other pulses of said series of output laser pulses; said system further comprising an automated control system capable of maintaining stationary conditions between said at least one pulse and all other pulses of said series of output laser pulses, controlling the gain of said amplifier;

said laser system comprises a photodiode that supplies a signal proportional to said output laser pulses emitted by said unstable laser resonator; and a processor modifies the gain of said laser resonator to reach a desired configuration by executing an algorithm to analyse treatment of noise, identify peaks wherein time and amplitude of the pulses acquired are measured and compare said signal proportional to said output laser pulses emitted by said unstable laser resonator with the desired configuration.

2. The system according to claim 1, characterized in that said at least one pulse has an energy higher than 500 mJ.

3. The system according to claim 1, characterized in that said at least one pulse has an energy higher than 1 J.

4. The system according to claim 1, characterized in that the at least one pulse is at least five times higher in energy than the energy of all other pulses of said series of pulses.

5. The system according to claim 1, characterized in that said at least one pulse has a duration shorter than or equal to 500 ps.

6. The system according to claim 1, characterized in that said series of laser pulses comprises at least two contingent pulses, each of which has a duration shorter than 1 ns and an energy higher than or equal to 50 mJ.

7. The system according to claim 1, characterized in that said resonator has a gain higher than 27 dB.

8. The system according to claim 1, characterized in that the temporal distance between two pulses of said series of pulses is comprised between 2 and 5 ns.

9. The system according to claim 1, characterized in that said injection pulse has a duration shorter than or equal to 2 ns, and an energy higher than or equal to 10 pJ.

10. The system according to claim 1, characterized in that said injection pulse has a full width at half maximum (FWHM) of less than 120 GHz.

11. A method for generating a series of output laser pulses at least one of which has a duration shorter than or equal to 2 ns and an energy higher than 100 mJ, said method comprising the steps of: supplying an injection pulse to an unstable laser resonator, said laser resonator having an optical switch, said step of supplying an injection pulse occurring in synchronism with opening of said optical switch; and said unstable laser resonator producing a series of output laser pulses comprising at least one pulse having a duration shorter than or equal to 2 ns and an energy higher than 100 mJ and at least three times higher than the energy of all other pulses of said series of output laser pulses, maintaining stationary conditions between said at least one pulse and all other pulses of said series of output laser pulses, controlling the gain of said unstable laser resonator; supplying a signal proportional to said series of output laser pulses emitted by said unstable laser resonator; executing an algorithm by a processor, said algorithm analyses data by treatment of noise, identification of peaks wherein time and amplitude of the pulses acquired are measured and comparing said signal proportional to said series of output laser pulses emitted by said unstable laser resonator with a desired configuration; modifying the gain of said unstable laser resonator to reach said desired configuration.

* * * * *